US010353361B2

(12) United States Patent
Ni

(10) Patent No.: US 10,353,361 B2
(45) Date of Patent: Jul. 16, 2019

(54) SMART DEVICE CONTROL SYSTEM

(71) Applicant: HANGZHOU TELEHEMS ELECTRONIS TECHNOLOGY CO., LTD., Zhejiang (CN)

(72) Inventor: Lizhou Ni, Zhejiang (CN)

(73) Assignee: HANGZHOU TELEHEMS ELECTRONICS TECHNOLOGY CO., LTD., Zhejiang (CN)

( * ) Notice: Subject to any disclaimer, the term of this patent is extended or adjusted under 35 U.S.C. 154(b) by 158 days.

(21) Appl. No.: 14/910,121

(22) PCT Filed: Jan. 15, 2015

(86) PCT No.: PCT/CN2015/070813
§ 371 (c)(1),
(2) Date: Feb. 4, 2016

(87) PCT Pub. No.: WO2015/106703
PCT Pub. Date: Jul. 23, 2015

(65) Prior Publication Data
US 2016/0195860 A1 Jul. 7, 2016

(30) Foreign Application Priority Data
Jan. 17, 2014 (CN) .......................... 2014 1 0021789

(51) Int. Cl.
G05B 15/02 (2006.01)
H04L 12/28 (2006.01)

(52) U.S. Cl.
CPC .......... G05B 15/02 (2013.01); H04L 12/2816 (2013.01); G05B 2219/25168 (2013.01); G05B 2219/2642 (2013.01)

(58) Field of Classification Search
None
See application file for complete search history.

(56) References Cited

U.S. PATENT DOCUMENTS 7,756,928 B1* 7/2010 Meenan ................ G06F 9/5055
709/205
2013/0079931 A1 3/2013 Wanchoo et al.
2014/0331135 A1* 11/2014 Sukoff .................... H04L 65/60
715/719

FOREIGN PATENT DOCUMENTS

CN 102497397 A 6/2012
CN 102938729 A 2/2013
(Continued)

OTHER PUBLICATIONS

Sep. 4, 2015 Written Opinion issued in PCT/CN2015/070813.

Primary Examiner — Angela Nguyen
(74) Attorney, Agent, or Firm — Oliff PLC

(57) ABSTRACT

A smart device control system, comprising a smart device control center, a smart device, and a user control terminal. By means of a local area network, the smart device is connected to the Internet and thereby also connected to the smart device control center, and the user control terminal is connected to the smart device control center by means of the Internet; the smart device control center comprises a communications unit, a data storage unit, a mass data processing unit, a smart processing unit, a service processing unit, and an instruction assembly unit. The smart device control center is connected by means of the Internet to the smart device and the user control terminal, achieving communications between the smart device and user control terminal and the smart device control center.

5 Claims, 1 Drawing Sheet

(56) References Cited

FOREIGN PATENT DOCUMENTS

| CN | 102984039 A | 3/2013 |
| CN | 103312827 A | 9/2013 |

* cited by examiner

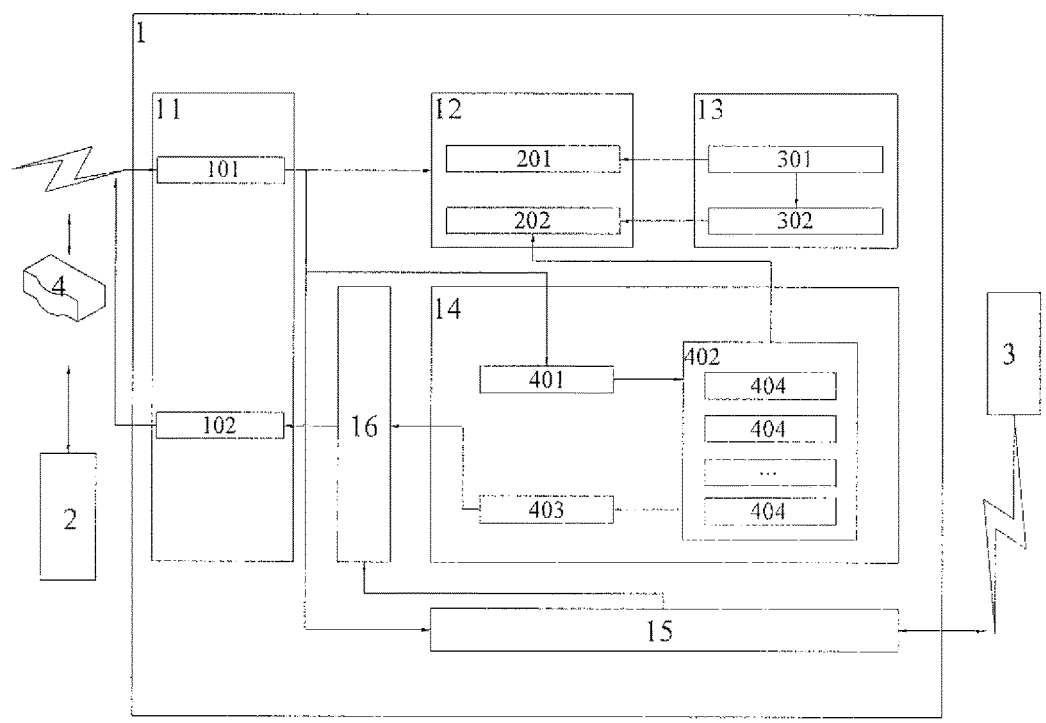

SMART DEVICE CONTROL SYSTEM

BACKGROUND OF THE INVENTION

1. Technical Field

The present invention relates to a smart device control system.

2. Description of Related Art

With the social and economic development as well as the improvement of living standards, traditional electrical equipment cannot meet people's requirements for intelligence and automation. In daily life, people expect increasingly high requirements for safety, comfort, energy saving and intelligence of home appliances; in industrial and agricultural production, people also give increasingly high requirements for automation degree and performance safety of electrical equipment used. The ideal state is that electrical equipment can not only start, stop and carry out self-regulation in a smart manner according to living and production environments and requirements, but also can ensure safety and give out alarm or perform self protection in case of a potential safety hazard. It is also preferable that electrical equipment can be remotely controlled and monitored for the operation, power consumption and other conditions of the electrical equipment in real time. There are similar products available in the market currently. However, on one hand, they have only part of functions or show insufficient functions and low intelligent degree; on the other hand, they are not suitable for common people and not easy to be popularized due to high cost.

BRIEF SUMMARY OF THE INVENTION

The technical problem to be solved by the present invention is to provide a smart device control system with full functions featuring low cost and easy popularization and capable of realizing active, smart and real-time remote control.

The technical solution to be adopted by the present invention for solving the technical problem is as below:

a smart device control system, comprising a smart device control center, a smart device and a user control terminal, wherein the smart device is connected to the Internet via the LAN and then further connected with the smart device control center, and the user control terminal is connected with the smart device control center via the Internet;

the smart device control center (SDCC for short), including a communication unit, a data storage unit, a massive data processing unit, a smart processing unit, a business processing unit and a command assembly unit, wherein the connection among the processing units is via a Gigabit Ethernet to guarantee the smooth communication among the processing units;

the smart device, including various smart home appliances installed in numerous households, for example, smart electric water heater, smart refrigerator and smart air conditioner, and also including smart production equipment applied in various production operations, for example, industrial machine tool, air blower and other smart industrial equipment, agricultural production machine and construction machinery;

the communication unit, which is connected with and executes data exchange with the smart device, receives the data sent from the smart device, including current status and surrounding environment information of the smart device, and also sends the control command sent by the smart device control center to the smart device; the communication unit, which is connected with and sends data to the data storage unit, sends the data received from the smart device to the data storage unit and stores them; the data storage unit is connected with and executes data exchange with the massive data processing unit which reads the data stored in the data storage unit for analysis and processing, and sends analysis and processing result data to the data storage unit for storage;

the communication unit, which is connected with and sends data to the smart processing unit, sends the data received from the smart device to the smart processing unit; the smart processing unit is further connected with and reads data from the data storage unit, and executes smart operation processing on the data read from the the communication unit and the data storage unit to generate control command toward the smart device; the smart processing unit, which is connected with and sends data to the command assembly unit, sends the control command generated to the command assembly unit; the command assembly unit is connected with and sends control command to the communication unit which then sends control command to the smart device so as to realize the control of the smart device;

the communication unit, which is connected with and sends data to the business processing unit, sends the data received from the smart device to the business processing unit; the business processing unit obtains the current operating status of the smart device according to the data sent from the communication unit; the business processing unit is further connected with and reads data from the command assembly unit; the business processing unit is connected with and executes data exchange with the user control terminal via the Internet; the business processing unit receives the control command sent from the user control terminal and feeds the information received from the smart device back to the user control terminal.

In addition to the technical solution above, the present invention can also adopt or combine the following further technical solution:

the communication unit includes a data receiving module and a data sending module, wherein the data receiving module receives the data sent from the smart device and forwards the data to the data storage unit, the smart processing unit and the business processing unit respectively after parsing with the parsing process as below: abstract code verification, AES decryption and binary data decoding according to BER encoding format so as to get the working status and environmental status information of the smart device such as electrical quantity, current, temperature and humidity; the data sending module receives and processes the control command sent from the command assembly unit, and then sends it to the smart device via the Internet, wherein the data processing made by the data sending module is as below: encoding according to BER encoding format, AES encryption and generation of abstract code by MD5, parsing and processing are used for communication between the smart device and SDCC so as to realize communication between various smart devices and SDCC.

The data storage unit, including a massive data storage module and an analysis data storage module, receives the data sent from the communication unit and stores them into the massive data storage module, wherein the analysis data storage module receives and stores the analysis result obtained by analysis and processing of the massive data processing unit and retrievable to the smart processing unit for smart algorithm processing. The analysis and processing is to obtain the analysis result of the user's behavioral habits in using the smart device based on the analysis by the massive data processing unit on the massive data stored. For instance, as to users of home appliances, the behavioral habits include when to go out, when to rest and when to use the appliance. As to users of smart industrial devices, the behavioral habits include when the users' production place begins to operate and to rest. Controlling the smart device based on these analysis results can provide users with a convenient and comfortable production or living environment.

The massive data processing unit includes a massive data analysis & processing module and an analysis result write-back module, wherein the massive data analysis & processing module reads the data in the massive data storage module at predetermined times for analysis and processing, and then the analysis result write-back module sends the analysis result processed to the analysis data storage module for storage. The analysis result stored is retrievable to the smart processing unit for smart algorithm processing.

The smart processing unit includes a smart processing module, an algorithm module and a command generation module. The smart processing module receives the data sent from the communication unit, including current status and surrounding environment information of the smart device, and automatically retrieves the matching smart algorithm in the algorithm module. A great number of smart algorithms for different brands and different kinds of smart devices are contained in the algorithm module. The smart processing module judges how to match and retrieve the corresponding smart algorithm in the algorithm module according to the information of the smart device received. The algorithm module reads the analysis result in the analysis data storage module, executes smart algorithm in combination with the data of the smart processing module to get the operation result for controlling the current smart device, and sends the operation result to the command generation module which converts the operation result to a control command and sends the control command to the command assembly unit.

The command assembly unit, after receiving the control command of the command generation module, executes assembly processing to the control command, and sends the control command assembled to the smart device via the data sending module of the communication unit so as to control the smart device.

The business processing unit receives the data sent from the data receiving module in the communication unit, obtains current operation status of the smart device according to the data, and sends the operation status to the user control terminal via the Internet for the user's examination; the business processing unit receives the control command for controlling the smart device sent from the user control terminal and sends the control command to the command assembly unit for assembly processing, wherein assembly processing is to convert abstract control command to the control signal (or command) identifiable and executable to the smart device. For example, in case that the control command is to switch on the air conditioner, while the air conditioner can identify infrared waveform only, it is required to change the "Switch On" command in the "switch on the air conditioner" to the infrared waveform identifiable to the air conditioner through the command assembly unit which sends the control command assembled to the smart device via the data sending module for controlling the smart device.

The beneficial effects of the present invention are as below: the smart device control system according to the present invention creates a smart device control center, and realizes communication between the smart device, the user control terminal and the smart device control center through the connection between the smart device and the user control terminal via the inter-net; the various processing units in the smart device control center are connected via a Gigabit Ethernet to guarantee the smooth communication between various processing units; the various processing units are set up on high-performance servers, and data exchange between units is carried out through specific protocol; when there are data to be sent to the smart device, the communication unit receives and parses the data and then sends the data to the data storage unit, the smart processing unit and the business processing unit for processing; the smart processing unit executes smart operation according to the information of the device status and surrounding environment contained in the data, generates a control demand and sends the control demand to the smart device via the communication unit, thus achieving active smart control of the smart device. Moreover, the business processing unit in the present invention can feed the device status information back to the user control terminal. In this way, when the user wants to remotely control the smart device, a command can be sent to the business processing unit via the user control terminal and then the business processing unit processes the command, thus realizing real-time remote control of the device. The smart device control center in the present invention can receive the operation status information sent from the smart device, such as voltage, current and electrical quantity or other information that the sensor can sense such as human activity, harmful gas, smoke, temperature and humidity, and can store and analyze the information, and control the operation of the device, not only ensuring safe and comfortable living and production environment, but also reporting the operation status of the device to the user who can perform remote control to the smart device via a cell phone or other mobile device.

BRIEF DESCRIPTION OF DRAWINGS

FIG. 1 shows a schematic view of the overall structure of the present invention.

DETAILED DESCRIPTION OF EMBODIMENTS

Refer to the drawings.

The smart device control system according to the present invention includes a smart device control center (SDCC) 1, a smart device 2 and a user control terminal 3, wherein the smart device 2 is connected to the Internet via a wireless router 4 at home and then further connected with the smart device control center 1, and the user control terminal 3 is connected with the smart device control center 1 via the Internet.

The smart device control center 1 includes a communication unit 11, a data storage unit 12, a massive data processing unit 13, a smart processing unit 14, a business processing unit 15 and a command assembly unit 16.

The communication unit 11 is connected with and executes data exchange with the smart device 2, the communication unit 11 is connected with and sends data to the data storage unit 12, and the data storage unit 12 is connected with and executes data exchange with the massive data processing unit 13.

The communication unit 11 is connected with and sends data to the smart processing unit 14, the smart processing unit 14 is connected with and reads data from the data storage unit 12, and also is connected with and sends data to the command assembly unit 16, and the command assembly unit 16 is connected with and sends control command to the communication unit 11.

The communication unit 11 is connected with and sends data to the business processing unit 15, and the business processing unit 15 is connected with and sends data to the command assembly unit 16, and also is connected with and executes data exchange with the user control terminal 3 via the Internet.

The communication unit 11 includes a data receiving module 101 and a data sending module 102, wherein the data receiving module 101 receives the data sent from the smart device 2, including current status of the smart device 2 such as voltage, current and electrical quantity, and surrounding environmental information such as human activity, harmful gas, smoke, temperature and humidity, parses the data received and then sends to the data storage unit 12, the smart processing unit 14 and the business processing unit 16 respectively, and the data sending module 102 receives and processes the control command sent from the command assembly unit 16, and then sends it to the smart device 2 via the Internet so as to control the smart device 2.

The data storage unit 12, including a massive data storage module 201 and an analysis data storage module 202, receives the data sent from the communication unit 11 and stores them into the massive data storage module 201, wherein the analysis data storage module 202 receives and stores the analysis result obtained through analysis and processing by the massive data processing unit 13.

The massive data processing unit 13 includes a massive data analysis & processing module 301 and an analysis result write-back module 302, wherein the massive data analysis & processing module 301 reads the data in the massive data storage module 201 at predetermined times for analysis and processing, and then the analysis result write-back module 302 sends the analysis result processed to the analysis data storage module 202 for storage.

The smart processing unit 14 includes a smart processing module 401, an algorithm module 402 and a command generation module 403, wherein the smart processing module 14 receives the data sent from the data receiving module 101, and automatically retrieves the matching smart algorithm 404 in the algorithm module 402. The algorithm module 402 reads the analysis data in the analysis data storage module 202, executes smart algorithm in combination with the data received from the smart processing module 401 to get the operation result for controlling the current smart device 2, and sends the operation result to the command generation module 403 which converts the operation result to a control command and sends the control command to the command assembly unit 16.

The command assembly unit 16, after receiving the control command sent from the command generation module 403, executes assembly processing to the control command, and sends the control command assembled to the smart device 2 via the data sending module 102 of the communication unit 11 so as to control the smart device 2.

The business processing unit 15 receives the data sent from the data receiving module 101 in the communication unit 11, obtains current operation status of the device according to the data, and sends the status to the user control terminal 3 via the Internet for the user's examination; the business processing unit 15 receives the control command for controlling the device sent from the user control terminal 3 and sends it to the command assembly unit 16 for assembly processing, and the command assembly unit 16 sends the control command assembled to the smart device 2 via the data sending module 102 for controlling the smart device 2.

By taking an electrical lighting appliance as an example, the smart lighting appliance 2 sends its working status and surrounding environmental information (such as electrical quantity, current, light intensity and body induction) to the smart device control center 1 at predetermined intervals, the communication unit 11 of the smart device control center 1 receives the data and forwards the data to the data storage unit 12 and the smart processing unit 14, and then the smart processing unit 14 invokes the smart algorithm 404 matching the lighting appliance. At this time, the smart algorithm 404 will judge whether there is anybody around the lighting appliance and whether the light is too weak. If the answer is yes, the lighting appliance will be switched on. Otherwise, it will not be switched on. If the lighting appliance has been switched on and there are no body induction data received in a certain period, the lighting appliance will be switched off to save electrical energy. The user can also view the operation status of the smart lighting appliance through the user control terminal 3 or remotely turn on or off the smart lighting appliance.

Furthermore, by taking a smart water heater as an example, the smart water heater 2 sends its working status and surrounding environmental information (such as electrical quantity, current, light intensity and body induction) to the smart device control center 1 at predetermined intervals, the communication unit 11 of the smart device control center 1 receives the data and forwards the data to the data storage unit 12 and the smart processing unit 14, the data storage unit 12 stores these data and the massive data processing unit 13 analyzes these data to get the user's get-up time and sleeping time, and then the smart processing unit 14 invokes the smart algorithm 404 matching the smart water heater. At this time, the smart algorithm 404 will judge the user's get-up time and switch on the water heater before the get-up time, and switch off the water heater after the sleeping time. Moreover, the smart processing unit 14 also processes the data sent from the smart water heater 2 in real time. If body induction information is contained in the data, indicating that there is somebody at home and hot water may be needed, then the water heater will be switched on; otherwise, when no body induction is found in a certain period, indicating that nobody is at home, the water heater will be switched off, thus providing convenience and energy saving. The user can also view the operation status of the smart water heater through the user control terminal 3 or remotely turn on or off the smart water heater.

Furthermore, by taking a smart air blower as an example, the smart air blower 2 sends its working status and surrounding environmental information (such as electrical quantity, current, ambient temperature and air condition) to the smart device control center 1 at predetermined intervals, the communication unit 11 of the smart device control center 1 receives the data and forwards the data to the data storage unit 12 and the smart processing unit 14, and then the smart processing unit 14 invokes the smart algorithm 404 matching the smart air blower 2. At this time, the smart algorithm 404 will judge whether the temperature and air quality where the air blower lies reach the degree of air blowing and dust removal or temperature decrease. If the answer is yes, the air blower will be switched on. Otherwise it will not be switched on. If the air blower has been switched on and the degree of dust removal or temperature decrease is not reached in a certain period, the air blower will be switched off to save electrical energy. The user can also view the operation status of the smart air blower 2 through the user control terminal 3 or remotely turn on or off the smart air blower 2.

What is claimed is:

1. A smart device control system comprising:
   a smart device;
   a user control terminal;
   a smart device control center connected to the user control terminal and the smart device via the Internet, wherein
   the smart device control center includes a data receiving module, a data sending module, a data storage unit, a massive data processing unit, a smart processing unit, and a business processing unit, and is configured to generate a control signal,
   the data receiving module and the data sending module are connected to and execute data exchange with the smart device and the data storage unit, and the data storage unit is connected to and executes data exchange with the massive data processing unit,
   the data receiving module is connected to and sends data to the smart processing unit, and the smart processing unit is connected to and reads data from the data storage unit, generates a control command, and provides the control command to the smart device control center so as to generate the control signal,
   the data receiving module is connected to and sends data to the business processing unit, and the business processing unit provides data to the smart device control center so as to generate the control signal, and also is connected to and executes data exchange with the user control terminal via the Internet,
   the data receiving module receives the data sent from the smart device and forwards the data from the smart device to the data storage unit, the smart processing unit and the business processing unit respectively after parsing, and the data sending module receives and processes the control signal generated by the smart device control center, and then sends the control signal to the smart device via the Internet,
   the data storage unit includes a massive data storage and an analysis data storage, and
   the data storage unit receives data sent from the data receiving module and stores the data from the data receiving module into the massive data storage, and the analysis data storage receives and stores an analysis result obtained through analysis and processing by the massive data processing unit.

2. The smart device control system as claimed in claim 1, wherein the massive data processing unit reads data in the massive data storage at predetermined times for analysis and processing, and then sends a result of the analysis and the processing to the analysis data storage for storage.

3. The smart device control system as claimed in claim 2, wherein the smart processing unit receives data sent from the data receiving module, and automatically retrieves a matching smart algorithm, reads the result of the analysis and the processing, executes the smart algorithm in combination with the data received from the data receiving module to obtain an operation result for controlling the smart device, and converts the operation result to the control command, which is provided to the smart device control center for processing.

4. The smart device control system as claimed in claim 3, wherein after receiving the control command generated by the smart processing unit, the smart device control center executes assembly processing to the control command so as to generate the control signal, and sends the control signal to the smart device via the data sending module so as to control the smart device.

5. The smart device control system as claimed in claim 4, wherein the business processing unit receives data sent from the data receiving module obtains a current operation status of the smart device according to the data received from the data receiving module, and sends the current operation status to the user control terminal via the Internet, and
   wherein the business processing unit receives a control command sent from the user control terminal and provides the control command sent from the user control terminal to the smart device control center for assembly processing so as to generate the control signal based on the control command sent from the user terminal, and the smart device control center sends the control signal to the smart device via the data sending module for controlling the smart device.

* * * * *